(12) United States Patent
Lin

(10) Patent No.: US 10,507,962 B2
(45) Date of Patent: Dec. 17, 2019

(54) GLASS SCREEN FILM APPLICATOR AND CARRIER MODULE THEREOF

(71) Applicant: Chia-Ching Lin, Taipei (TW)

(72) Inventor: Chia-Ching Lin, Taipei (TW)

( * ) Notice: Subject to any disclaimer, the term of this patent is extended or adjusted under 35 U.S.C. 154(b) by 50 days.

(21) Appl. No.: 15/939,426

(22) Filed: Mar. 29, 2018

(65) Prior Publication Data

US 2018/0282038 A1    Oct. 4, 2018

Related U.S. Application Data

(63) Continuation-in-part of application No. 15/823,772, filed on Nov. 28, 2017.

(30) Foreign Application Priority Data

Mar. 31, 2017   (TW) .............................. 106204611 U
Mar. 7, 2018    (TW) .............................. 107202970 U

(51) Int. Cl.
| | |
|---|---|
| *B65D 65/40* | (2006.01) |
| *B29C 63/02* | (2006.01) |
| *B29C 63/00* | (2006.01) |
| *G02B 1/14* | (2015.01) |
| *H04B 1/38* | (2015.01) |
| *H04M 1/02* | (2006.01) |
| *B25B 27/00* | (2006.01) |

(52) U.S. Cl.
CPC .............. *B65D 65/40* (2013.01); *B29C 63/02* (2013.01); *G02B 1/14* (2015.01); *H04B 1/38* (2013.01); *H04M 1/0202* (2013.01); *B25B 27/0092* (2013.01); *B29C 2063/0008* (2013.01)

(58) Field of Classification Search
CPC ............ B29C 2063/0008; B29C 63/02; B29C 63/0017; B29C 63/0047; B32B 38/1833; B32B 2457/20; B32B 37/003; B32B 37/025; B32B 38/10; B25B 27/0092; B25B 33/00; B25B 27/00; B29L 2031/3437; G02B 1/14; B65D 65/40
USPC ........................................ 156/574, 579, 538
See application file for complete search history.

(56) References Cited

U.S. PATENT DOCUMENTS

| | | | |
|---|---|---|---|
| 2015/0107767 A1* | 4/2015 | Wadsworth ........... | B29C 66/861 156/324 |
| 2017/0001364 A1* | 1/2017 | MacDonald ............. | B32B 7/12 |

* cited by examiner

*Primary Examiner* — Philip C Tucker
*Assistant Examiner* — Jimmy R Smith, Jr.
(74) *Attorney, Agent, or Firm* — Li & Cai Intellectual Property (USA) Office

(57) ABSTRACT

A glass screen film applicator includes a carrier, a positioning member integrally formed as a one-piece structure, and a clamping mechanism fastened to the carrier. The carrier includes a mounting slot and an accommodating trough, and the accommodating trough includes a rail hole recessed in a bottom thereof. The positioning member includes an L-shaped structure and a plurality of positioning pillars extending from the L-shaped structure, and the L-shaped structure has a positioning corner arranged on an inner side thereof. The clamping mechanism includes a holder and a moving unit. The holder and the positioning corner respectively clamp two diagonal corners of a mobile device by the moving unit, and the positioning pillars allow the glass screen film structure to be disposed on and aligned with the mobile device.

12 Claims, 17 Drawing Sheets

GLASS SCREEN FILM APPLICATOR AND CARRIER MODULE THEREOF

CROSS-REFERENCE TO RELATED PATENT APPLICATION

This U.S. Non-provisional Application for Patent is a continuation-in-part application of patent application Ser. No. 15/823,772 filed on Nov. 28, 2017, which claims the priority of Taiwan patent application serial no. 106204611, filed Mar. 31, 2017, and is now issued (as patent number M547122). The entirety of each of the above-mentioned patent applications is hereby incorporated by reference herein and made as a part of this specification.

BACKGROUND OF THE DISCLOSURE

Field of the Disclosure

The present disclosure relates to a film applicator; in particular, to a glass screen film applicator and a carrier module thereof.

Description of Related Art

A conventional mobile device (e.g., a smart phone) is usually attached with a glass screen film on a screen thereof, thereby preventing the screen from being scratched. However, since a film attaching process of the glass screen film and the screen is achieved by a user's observation, the glass screen film cannot be accurately adhered onto the screen due to observation error or finger jitter. That is to say, the glass screen film and the screen easily have an offset, so that the glass screen film needs to be torn off and abandoned.

SUMMARY OF THE DISCLOSURE

The present disclosure provides a glass screen film applicator and a carrier module thereof to solve the inadequacies associated with a film attaching process of conventional glass screen film and a mobile device.

The present disclosure provides a glass screen film applicator, which includes a carrier, a positioning member, and a clamping mechanism. The carrier includes a mounting slot and an accommodating trough. The carrier defines a longitudinal direction and a width direction perpendicular to the longitudinal direction, and the accommodating trough includes a rail hole recessed in a bottom thereof and parallel to the longitudinal direction. The positioning member is integrally formed as a one-piece structure and is mounted in the mounting slot. The positioning member includes an L-shaped structure and a plurality of positioning pillars extending from the L-shaped structure and arranged in a row parallel to the longitudinal direction. The L-shaped structure has a positioning corner arranged on an inner side thereof. Each of the positioning pillars is perpendicular to the longitudinal direction and the width direction, and the positioning corner has two lateral walls parallel to the longitudinal direction and the width direction, respectively. The clamping mechanism includes a holder and a moving unit. A part of the moving unit is arranged in the carrier, and another part of the moving unit passes through the rail hole and is connected to the holder. The moving unit is configured to move the holder for adjusting a relative position between the holder and the positioning corner, and the positioning pillars are configured for positioning a glass screen film structure. When a mobile device is disposed on the carrier, the holder and the positioning corner are configured to respectively clamp two diagonal corners of the mobile device, and the positioning pillars are configured to allow the glass screen film structure to be disposed on and aligned with the mobile device.

The present disclosure also provides a carrier module of a glass screen film applicator, and the carrier module includes a carrier and a positioning member. The carrier includes a mounting slot and an accommodating trough. The carrier defines a longitudinal direction and a width direction perpendicular to the longitudinal direction, and the accommodating trough includes a rail hole recessed in a bottom thereof and parallel to the longitudinal direction. The positioning member is integrally formed as a one-piece structure and is mounted in the mounting slot. The positioning member includes an L-shaped structure and a plurality of positioning pillars extending from the L-shaped structure and arranged in a row parallel to the longitudinal direction. The L-shaped structure has a positioning corner arranged on an inner side thereof. Each of the positioning pillars is perpendicular to the longitudinal direction and the width direction, and the positioning corner has two lateral walls parallel to the longitudinal direction and the width direction, respectively. The positioning corner is configured to abut against a corner of a mobile device, and the positioning pillars are configured to position a glass screen film structure.

In summary, for the glass screen film applicator and the carrier module provided by the present disclosure, since the L-shaped structure and the positioning pillars are integrally formed as a one-piece structure, the relative position of the positioning pillars and the positioning corner of the L-shaped structure can be effectively maintained. Therefore, the glass screen film structure sleeving around the positioning pillars and the mobile device abutted against the positioning corner can have a more accurate relative position therebetween.

In order to further appreciate the characteristics and technical contents of the present disclosure, references are hereunder made to the detailed descriptions and appended drawings in connection with the present disclosure. However, the appended drawings are merely shown for exemplary purposes, and should not be construed as restricting the scope of the present disclosure.

DETAILED DESCRIPTION OF THE EXEMPLARY EMBODIMENTS

Figure 1:
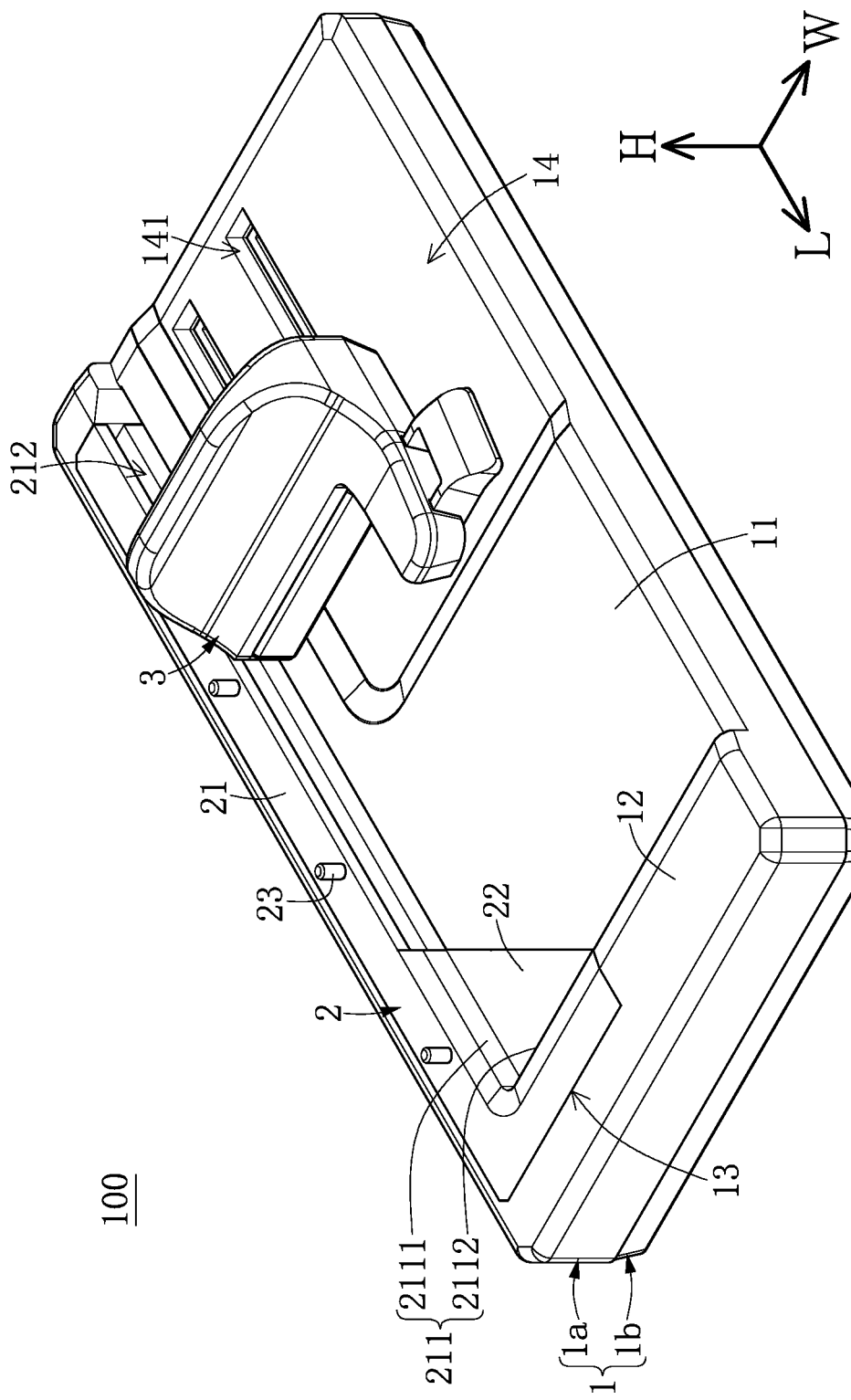
FIG. 1 is a perspective view showing a glass screen film applicator according to a first embodiment of the present disclosure.
Figure 2:
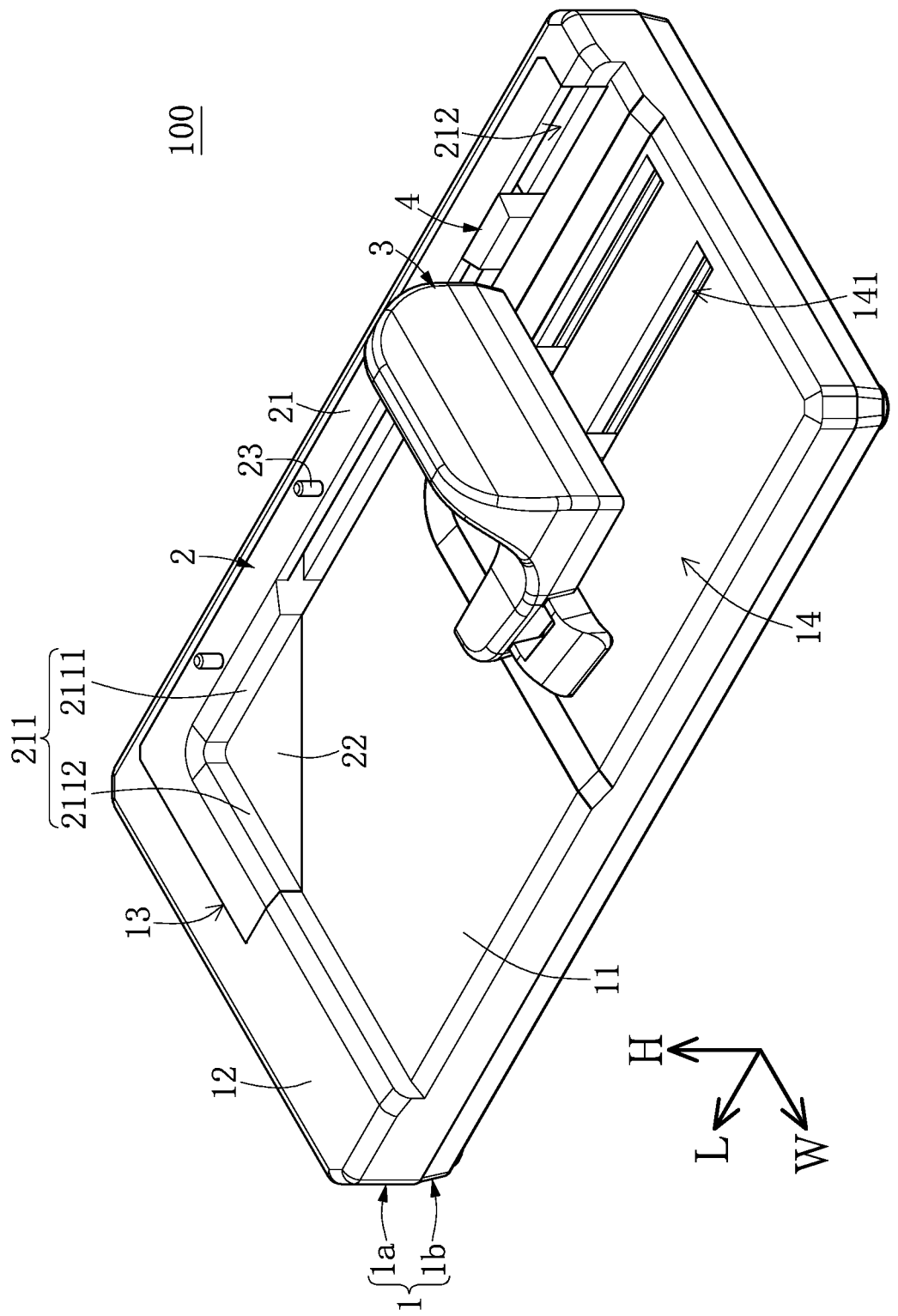
FIG. 2 is a perspective view showing the glass screen film applicator from another perspective according to the first embodiment of the present disclosure.

References are hereunder made to the detailed descriptions and appended drawings in connection with the present disclosure. However, the appended drawings are merely provided for exemplary purposes, and should not be construed as restricting the scope of the present disclosure.

First Embodiment

Reference is made to FIGS. 1 to 11, which illustrate a first embodiment of the present disclosure. As shown in FIGS. 1 to 6, the present embodiment discloses a glass screen film applicator 100 for accurately aligning a glass screen film structure 300 with a screen of a mobile device 200 (e.g., a smart phone). It should be noted that the glass screen film applicator 100 of the present embodiment is not applied to a soft screen film.

The glass screen film structure 300 includes a glass screen film, a release film attached to an adhesive surface of the glass screen film, and an aligning film attached to a protective surface of the glass screen film that is provided without viscosity. The glass screen film of the present embodiment means a hard screen film, and the material of the glass screen film is not limited by glass. In other words, the glass screen film of the present embodiment can be any materials other than glass.

The glass screen film applicator 100 includes a carrier 1, a positioning member 2 and a clamping mechanism 3 both fastened to the carrier 1, and an abutting block 4 disposed on the positioning member 2 (and the carrier 1). The carrier 1, the positioning member 2, and the abutting block 4 in the present embodiment can be jointly defined as a carrier module (not labeled), and the carrier module in the present embodiment cooperates with the clamping mechanism 3, but the present disclosure is not limited thereto. For example, in other embodiments of the present disclosure, the carrier module can be independently used or can cooperate with other mechanisms.

Figure 7:
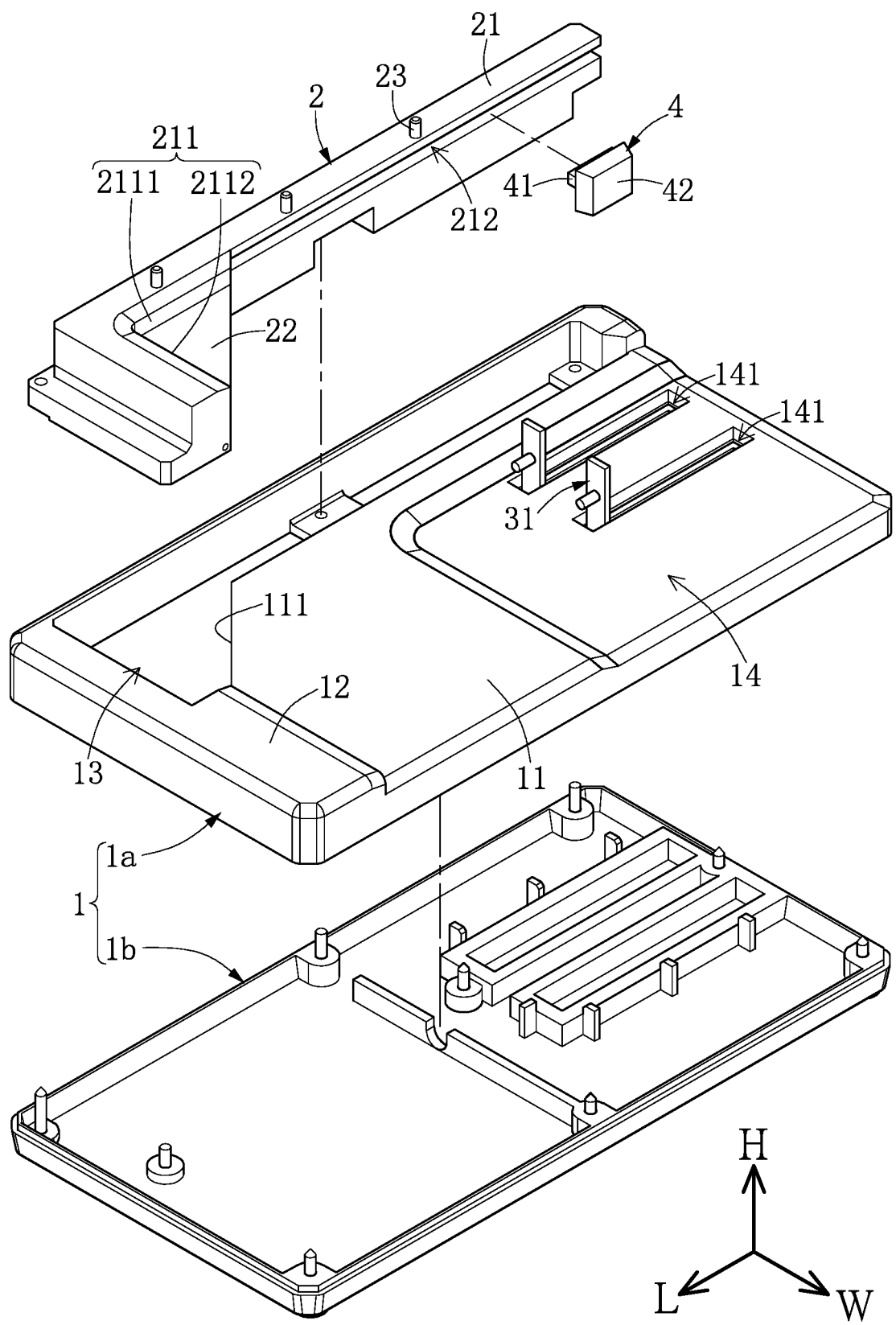
FIG. 7 is a first exploded view showing a carrier module and a moving unit of FIG. 6.
Figure 8:
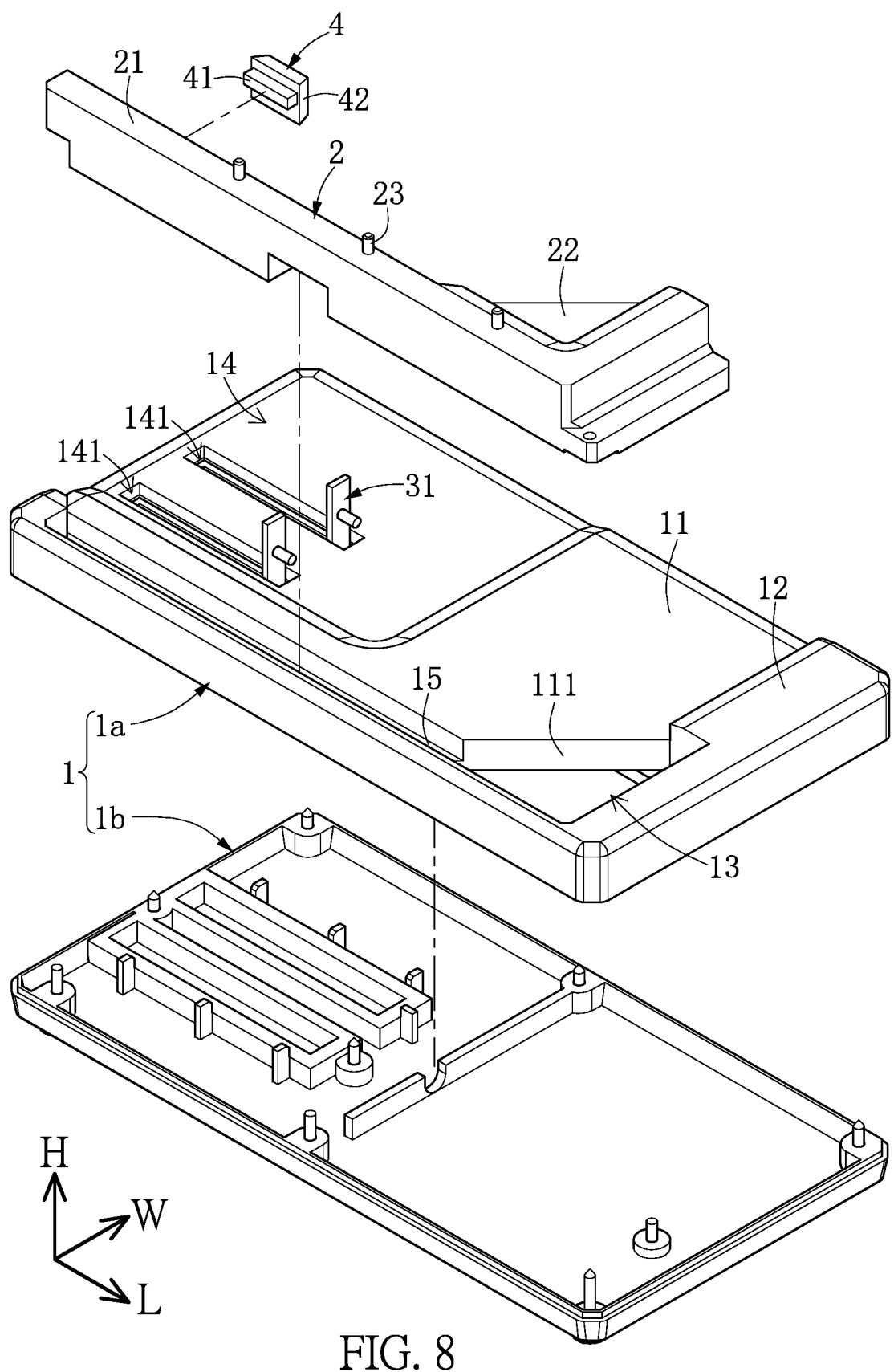
FIG. 8 is a second exploded view showing the carrier module and the moving unit of FIG. 6.
Figure 9:
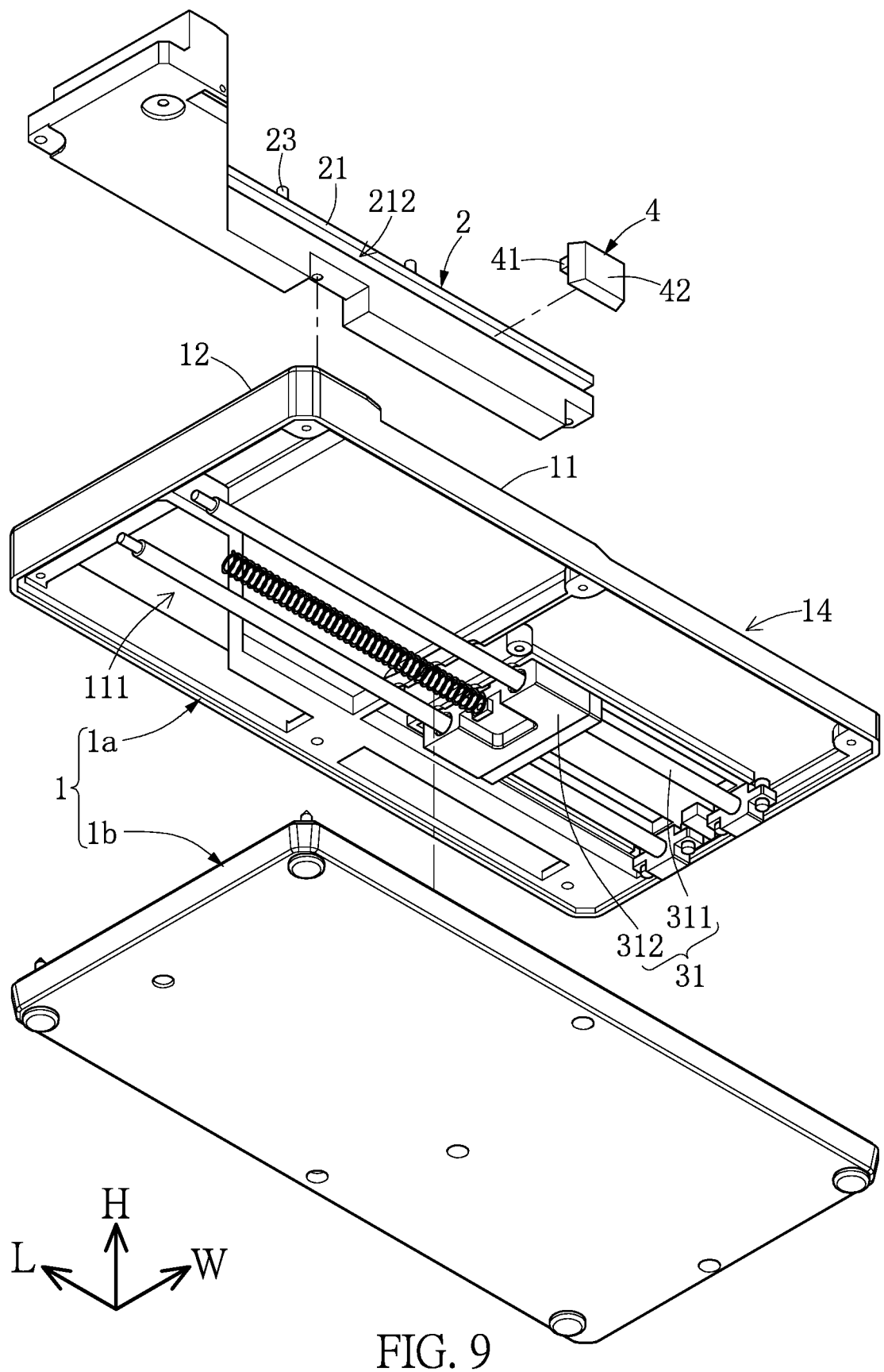
FIG. 9 is a third exploded view showing the carrier module and the moving unit of FIG. 6.

As shown in FIGS. 7 to 9, the carrier 1 in the present embodiment is formed by connecting an upper housing 1*a* to a lower housing 1*b*, the functional design of the carrier 1 is mainly formed on the upper housing 1*a*, but the present disclosure is not limited thereto. To facilitate a better understanding of the present embodiment, the carrier 1 defines a longitudinal direction L, a width direction W, and a height direction H, which are perpendicular to each other. The height direction H in the present embodiment is parallel to a connecting direction of the upper housing 1*a* and the lower housing 1*b*.

The carrier 1 includes a carrying surface 11 and an L-shaped retaining wall 12 arranged on an outer portion of the carrying surface 11. The carrying surface 11 is configured to bear a back surface of the mobile device 200. The carrying surface 11 is in a substantially rectangular shape having a chamfer 111, and the chamfer 111 is arranged adjacent to, and preferably facing towards, an inner corner of the L-shaped retaining wall 12, but the present disclosure is not limited thereto.

The carrier 1 includes a mounting slot 13 and an accommodating trough 14. In the present embodiment, the mounting slot 13 is recessed from the inner edge of the L-shaped retaining wall 12 to the chamfer 111 of the carrying surface 11, and the mounting slot 13 is in a substantial L-shape. The accommodating trough 14 is configured to accommodate any electronic component (e.g., a camera or a flash lamp) protruding from the back surface of the mobile device 200. The accommodating trough 14 is recessed in a portion of the carrying surface 11 arranged not connected to the chamfer 111. An area of the accommodating trough 14 is substantial 50% of an area of the carrying surface 11, a length of the accommodating trough 14 is substantial 50% of a length of the carrying surface 11, and a width of the accommodating trough 14 is substantial 90% of a width of the carrying surface 11, but the present disclosure is not limited thereto.

Moreover, the accommodating trough 14 includes two rail holes 141 recessed in a bottom thereof and parallel to the longitudinal direction L. The two rail holes 141 are arranged adjacent to the mounting slot 13. In the present embodiment, the number of the rail holes 141 is two, but the present disclosure is not limited thereto. In other embodiments of the present disclosure, the accommodating trough 14 can include at least one rail hole 141.

The carrier 1 is recessed to form a stepped portion 15 parallel to the longitudinal direction L and arranged in the mounting slot 13. In the present embodiment, the stepped portion 15 is in an elongated shape, a long edge of the stepped portion 15 (i.e., a top edge of the stepped portion 15 as shown in FIG. 8) is connected to a long edge of the carrying surface 11, and a short edge of the stepped portion 15 (i.e., a right edge of the stepped portion 15 as shown in FIG. 8) is connected to the chamfer 111 of the carrying surface 11.

The positioning member 2 is integrally formed as a one-piece structure, and is preferably manufactured by processing a metallic material. In other words, a hardness of the positioning member 2 is preferably larger than that of the carrier 1 (e.g., the carrier 1 can be made of plastic), thereby preventing the positioning member 2 from being deformed to affect the positioning accuracy between the glass screen film 300 and the mobile device 200, but the present disclosure is not limited thereto.

The positioning member 2 is mounted in the mounting slot 13 of the carrier 1. The positioning member 2 includes an L-shaped structure 21, a reinforcing sheet 22 connected to an inner edge of the L-shaped structure 21, and a plurality of positioning pillars 23 extending from the L-shaped structure 21 and arranged in a row parallel to the longitudinal direction L. In the height direction H, a lower portion of the L-shaped structure 21 and the reinforcing sheet 22 are not higher than the carrying surface 11 of the carrier 1, that is, not protruding out of the carrying surface 11, and an upper portion of the L-shaped structure 21 and the positioning pillars 23 extending therefrom are higher than the carrying surface 11 of the carrier 1. In the present embodiment, the L-shaped structure 21 of the positioning member 2 is in substantial complementation with the L-shaped retaining wall 12 of the carrier 1. That is to say, an outer surface of the L-shaped structure 21 is flush with that of the L-shaped retaining wall 12, but the present disclosure is not limited thereto.

Specifically, the L-shaped structure 21 has a positioning corner 211 arranged on an inner side of the L-shaped structure 21, and the positioning corner 211 has two lateral walls 2111, 2112 respectively parallel to the longitudinal direction L and the width direction W. In other words, the positioning corner 211 is of a substantial right angle and is arranged adjacent to the chamfer 111 of the carrier 1. When the mobile device 200 is disposed on the carrying surface 11 of the carrier 1, the positioning corner 211 in the present embodiment is configured to abut against a corner of the mobile device 200. Moreover, the L-shaped structure 21 includes a receiving groove 212 parallel to the longitudinal direction L and arranged adjacent to the stepped portion 15, and when the mobile device 200 is disposed on the carrying surface 11 of the carrier 1, the receiving groove 212 is configured to accommodate at least one button arranged on a lateral side of the mobile device 200. In the present embodiment, the receiving groove 212 is recessed in a lateral surface of the L-shaped structure 21 facing the accommodating trough 14 (or the clamping mechanism 3), and is arranged adjacent to the stepped portion 15. The receiving groove 212 is preferably recessed from an end of the L-shaped structure 21, which is distant from the positioning corner 211, to the lateral wall 2111 of the positioning corner 211, but the present disclosure is not limited thereto.

The reinforcing sheet 22 is connected to the two lateral walls 2111 and 2112 of the positioning corner 211, thereby increasing the structural strength of the positioning corner 211. The reinforcing sheet 22 is in complementation with the chamfer 111 of the carrier 1. In the present embodiment, an oblique edge of the reinforcing sheet 22 is substantially aligned with that of the chamfer 111, and an outer surface of the reinforcing sheet 22 is coplanar with the carrying surface 11 of the carrier 1, so that the back surface of the mobile device 200 can be flatly disposed on the carrying surface 11 of the carrier 1 and the reinforcing sheet 22.

Each of the positioning pillars 23 in the present embodiment is parallel to the height direction H, and is formed by integrally extending from a surface of the L-shaped structure 21 (e.g., a top surface of the L-shaped structure 21 as shown in FIG. 7) facing away from the lower housing 1b of the carrier 1, so that the positioning pillars 23 can be used to position the glass screen film structure 300 for maintaining the relative position between the glass screen film structure 300 and the positioning corner 211.

Figure 3:
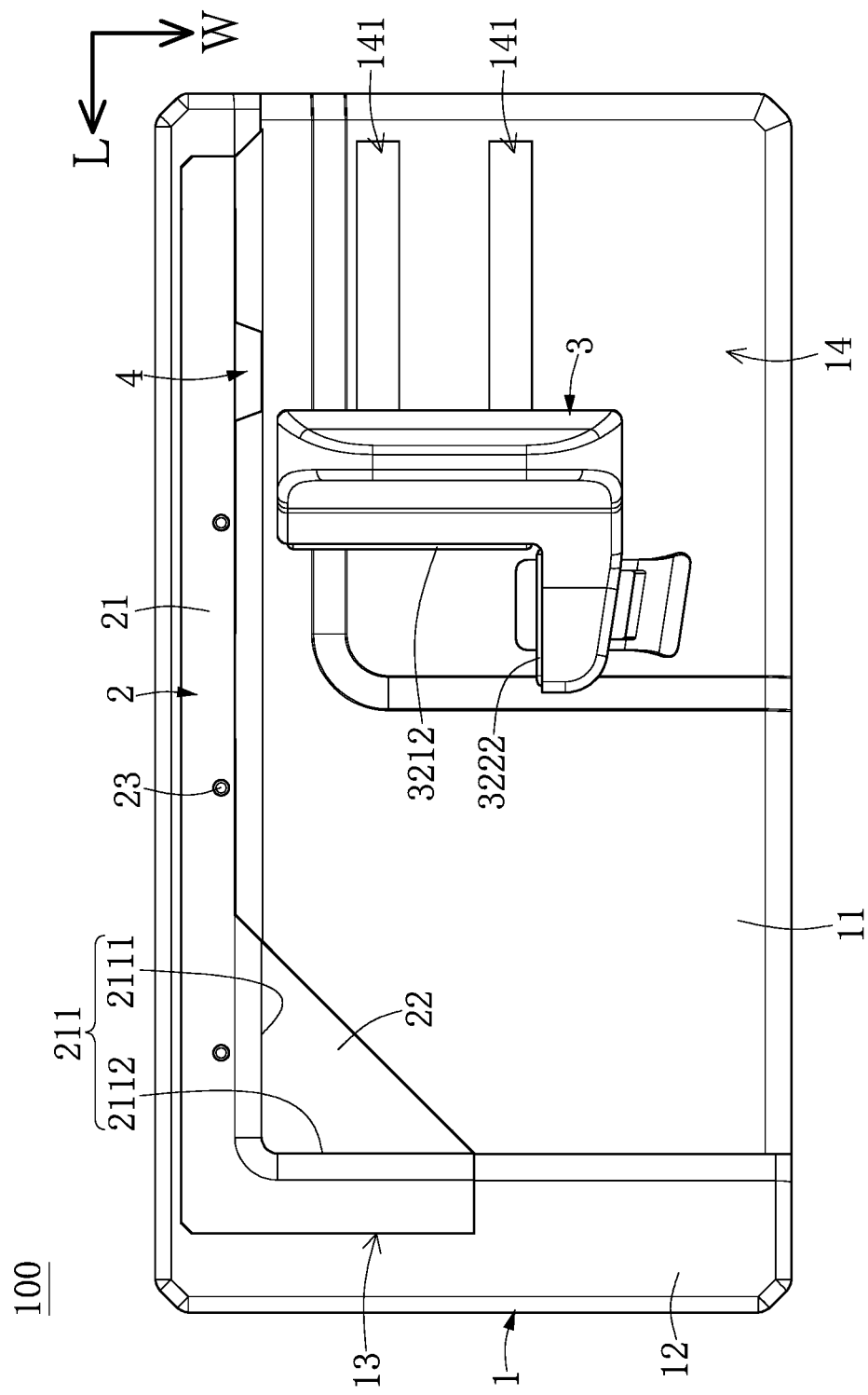
FIG. 3 is a top planar view of FIG. 1.
Figure 4:
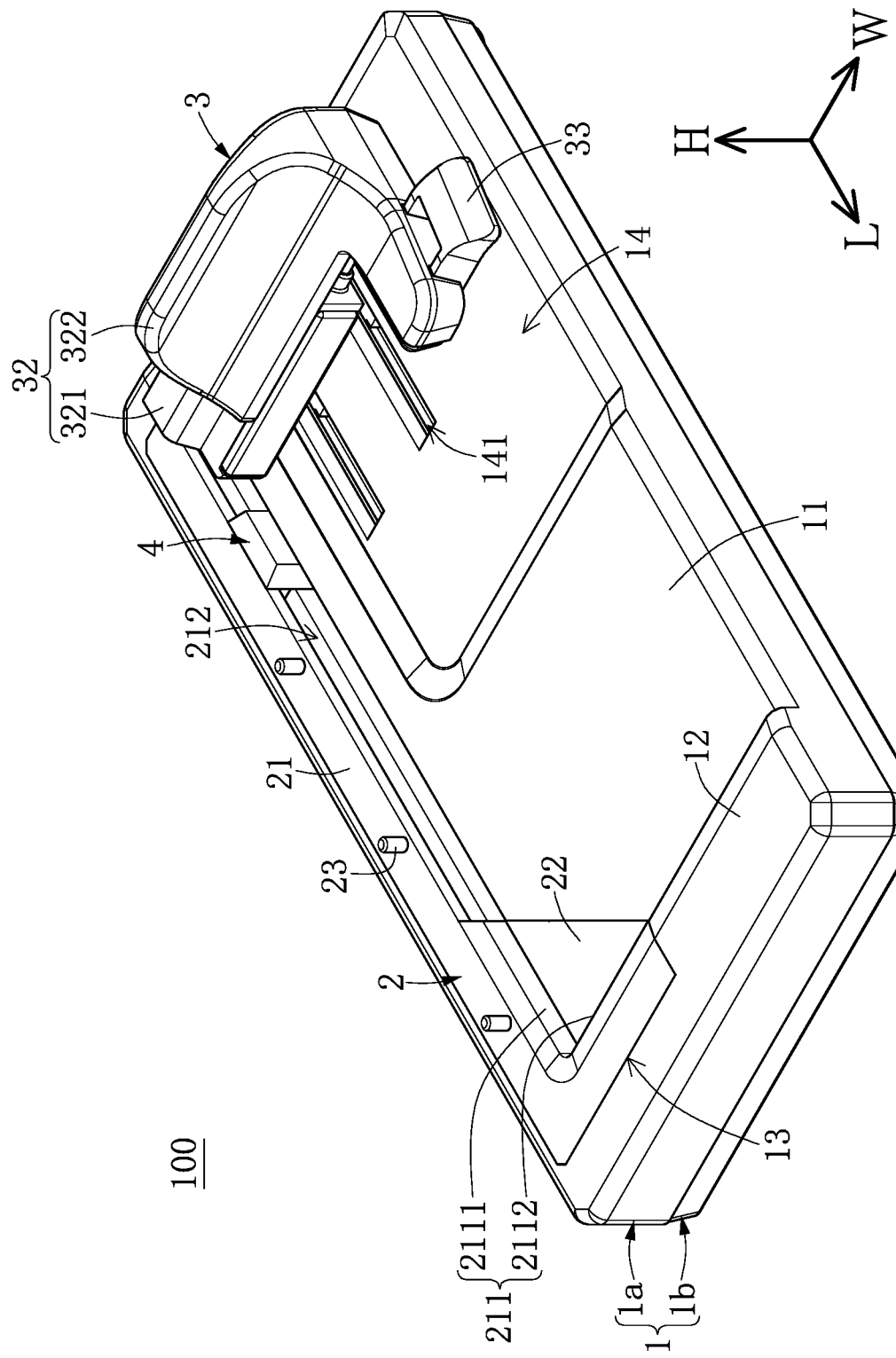
FIG. 4 is a perspective view showing the glass screen film applicator when a clamping mechanism is moved according to the first embodiment of the present disclosure.
Figure 5:
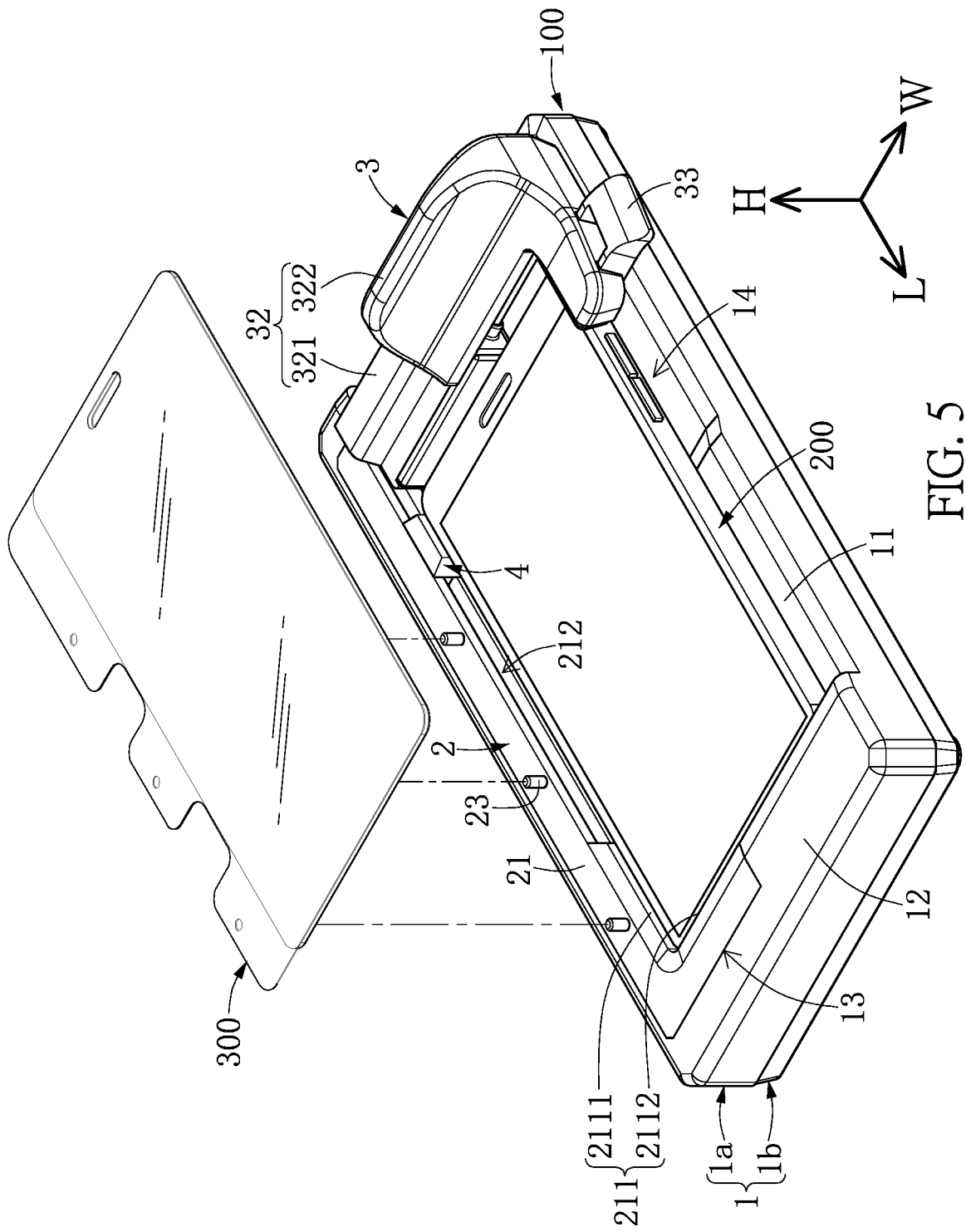
FIG. 5 is a perspective view showing the glass screen film applicator applied to a film attaching process according to the first embodiment of the present disclosure.

In more detail, a portion of the L-shaped structure 21 (i.e., a left portion of the L-shaped structure 21 as shown in FIG. 3) arranged beside the positioning corner 211 in the width direction W is preferably provided with at least one of the positioning pillars 23, and a portion of the L-shaped structure 21 (i.e., a right portion of the L-shaped structure 21 as shown in FIG. 3) arranged adjacent to the rail holes 141 can be provided without any one of the positioning pillars 23, but the present disclosure is not limited thereto.

Since the L-shaped structure 21, the reinforcing sheet 22, and the positioning pillars 23 in the present embodiment are integrally formed as a one-piece structure, the positioning corner 211 of the L-shaped structure 21 and the reinforcing sheet 22 can provide movement restrictions in longitudinal direction L, the width direction W, and the height direction H to the mobile device 200, and the relative position of the positioning pillars 23, the positioning corner 211 of the L-shaped structure 21, and the reinforcing sheet 22 can be effectively maintained. Therefore, a more accurate relative position between the glass screen film structure 300 sleeving around the positioning pillars 23 and the mobile device 300 abutted against the positioning corner 211 (and the reinforcing sheet 22) can be attained.

The abutting block 4 is movably disposed on the receiving groove 212 of the positioning member 2 and the stepped portion 15 of the carrier 1, and the abutting block 4 is movable along the receiving groove 212 and the stepped portion 15, so that when the mobile device 200 is disposed on the carrying surface 11 of the carrier 1, the abutting block 4 is configured to abut against the lateral side of the mobile device 200. In other words, the position of the butting block 4 can be adjusted according to the position of the button of the mobile device 200, thereby allowing that the button of the mobile device 200 is arranged in the receiving groove 212 and the lateral side of the mobile device 200 is abutted against the abutting block 4.

Specifically, the abutting block 4 includes a sliding portion 41 and an abutting portion 42 connected to an end of the sliding portion 41. The sliding portion 41 is slidably inserted into the receiving groove 212, and a lower part of the abutting portion 42 is disposed on the stepped portion 15 and is limited by (or sandwiched between) the L-shaped structure 21 and the stepped portion 15, thereby preventing the abutting block 4 from being rotated when moving. An upper part of the abutting portion 42 protrudes from the carrying surface 11 of the carrier 1 for abutting against the lateral side of the mobile device 200. Moreover, a surface of the abutting block 4 for abutting against the lateral side of the mobile device 200 is preferably coplanar with the lateral wall 2111 of the positioning corner 211.

Figure 6:
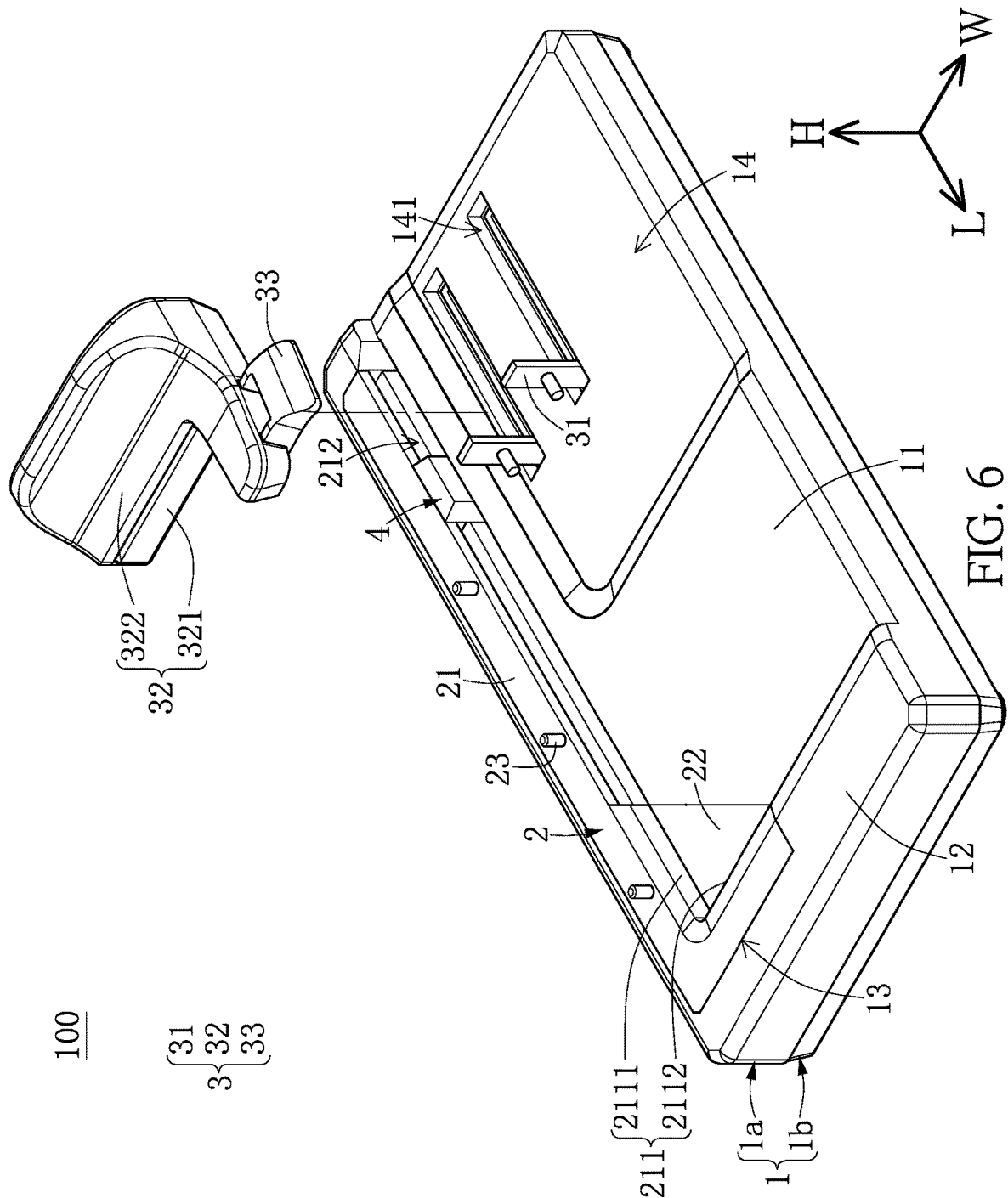
FIG. 6 is an exploded view of FIG. 1.
Figure 10:
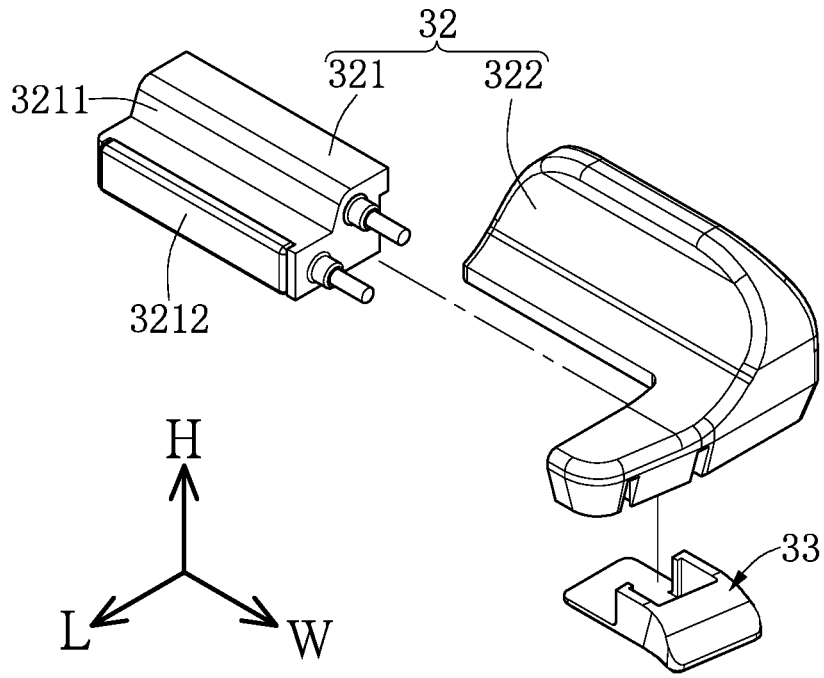
FIG. 10 is a first exploded view showing a holder and a supporting member of FIG. 6.
Figure 11:
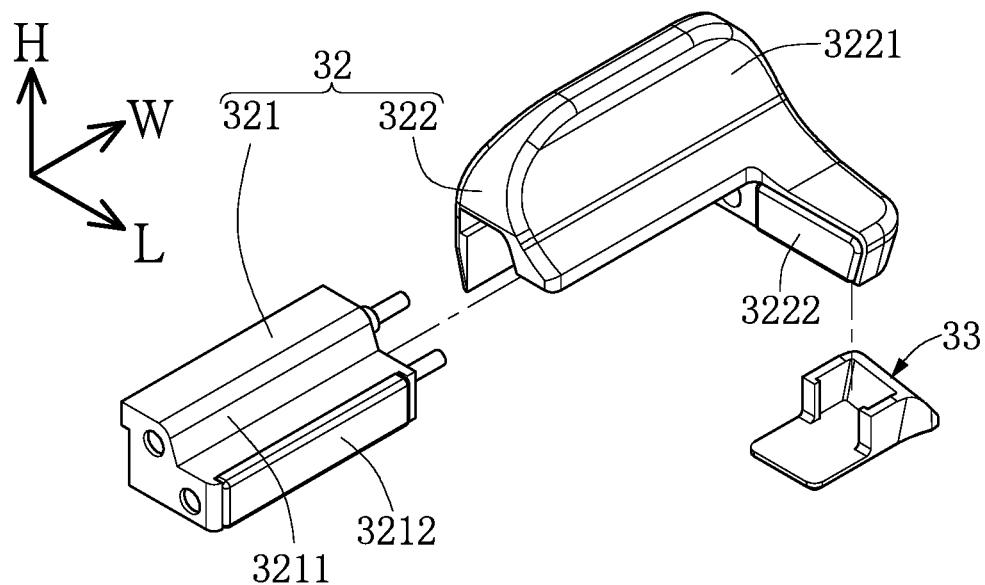
FIG. 11 is a second exploded view showing the holder and the supporting member of FIG. 6.
Figure 12:
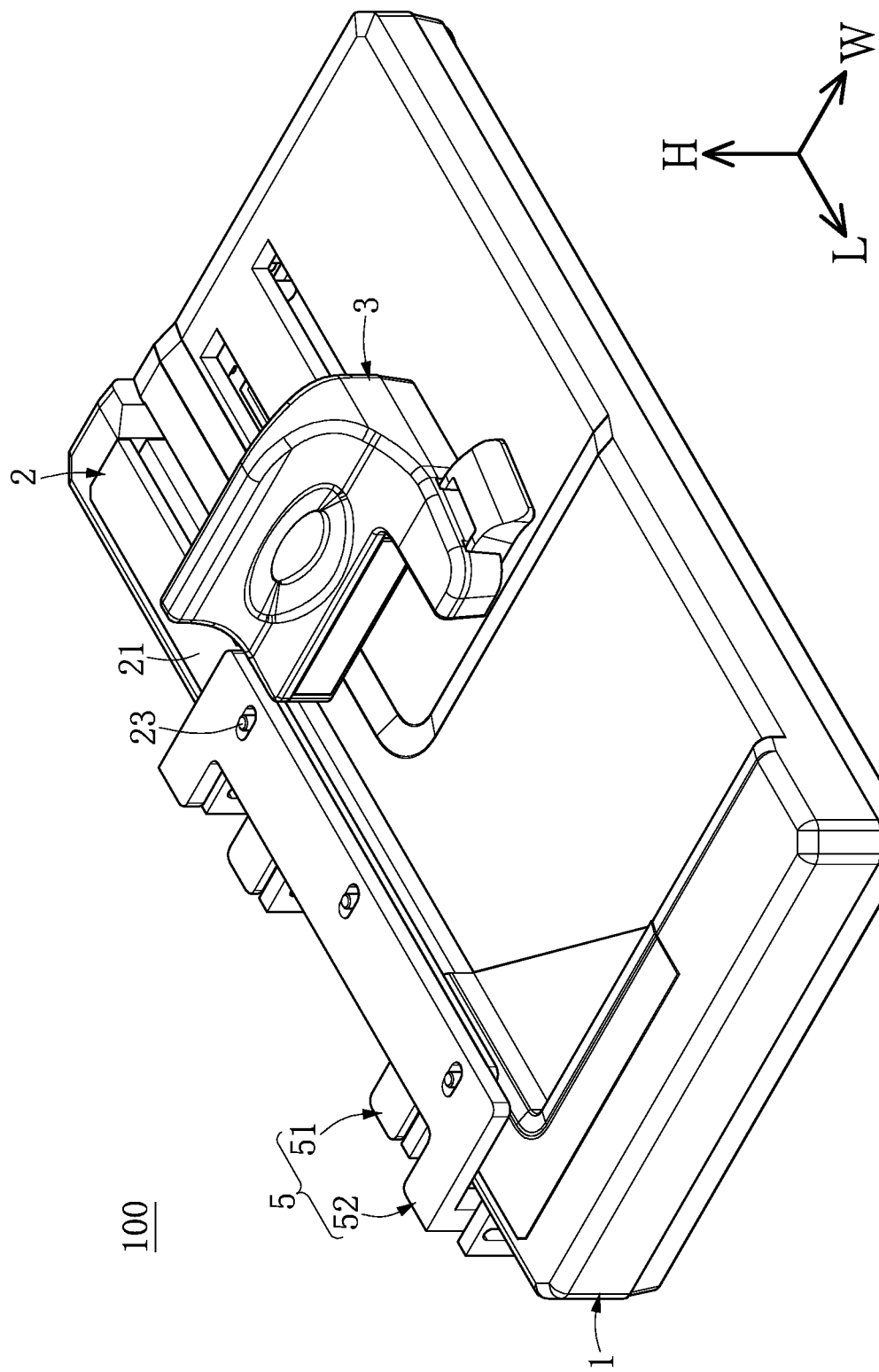
FIG. 12 is a perspective view showing a glass screen film applicator according to a second embodiment of the present disclosure.
Figure 13:
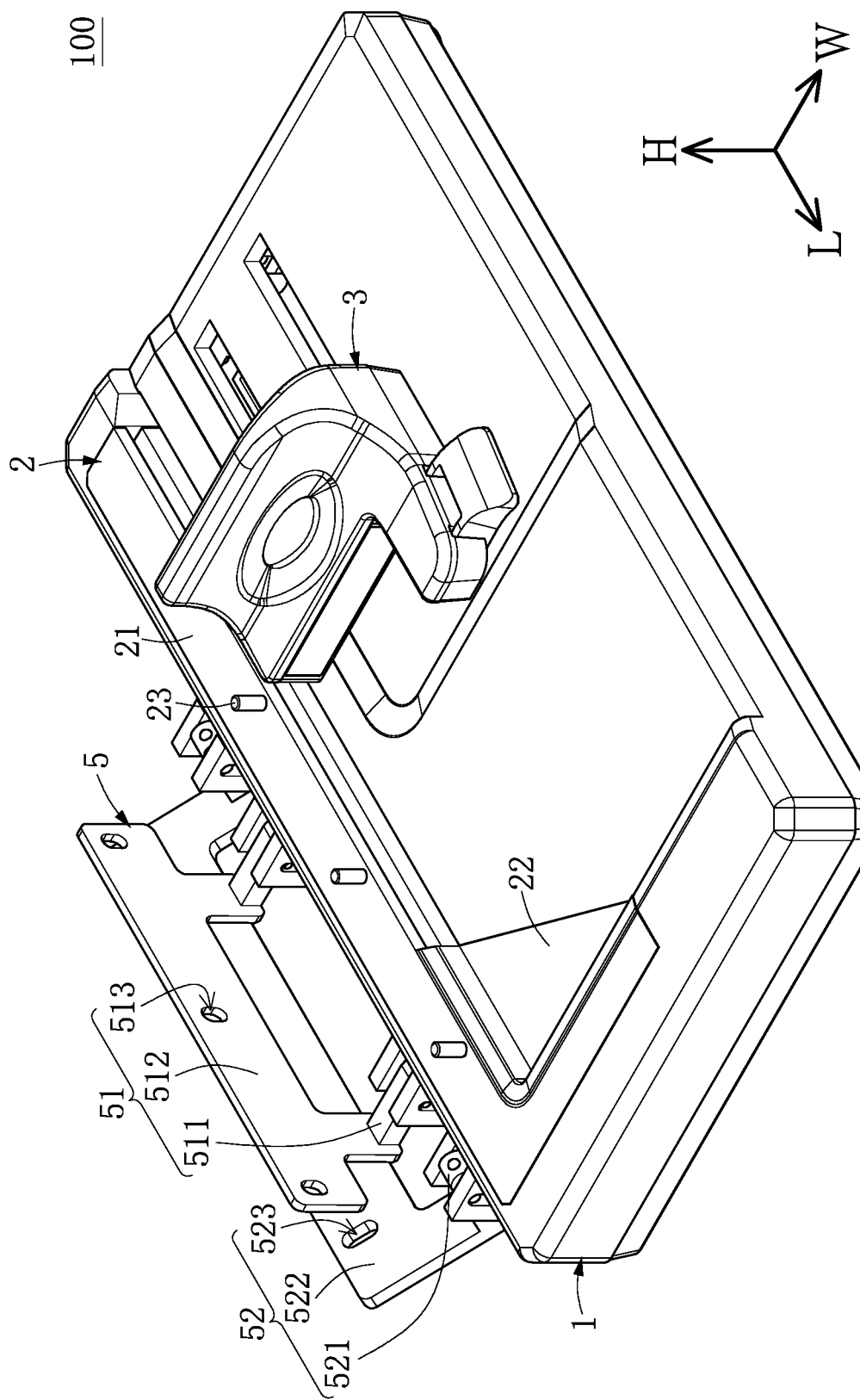
FIG. 13 is a perspective view showing the glass screen film applicator when a height adjustment assembly is rotated according to the second embodiment of the present disclosure.
Figure 14:
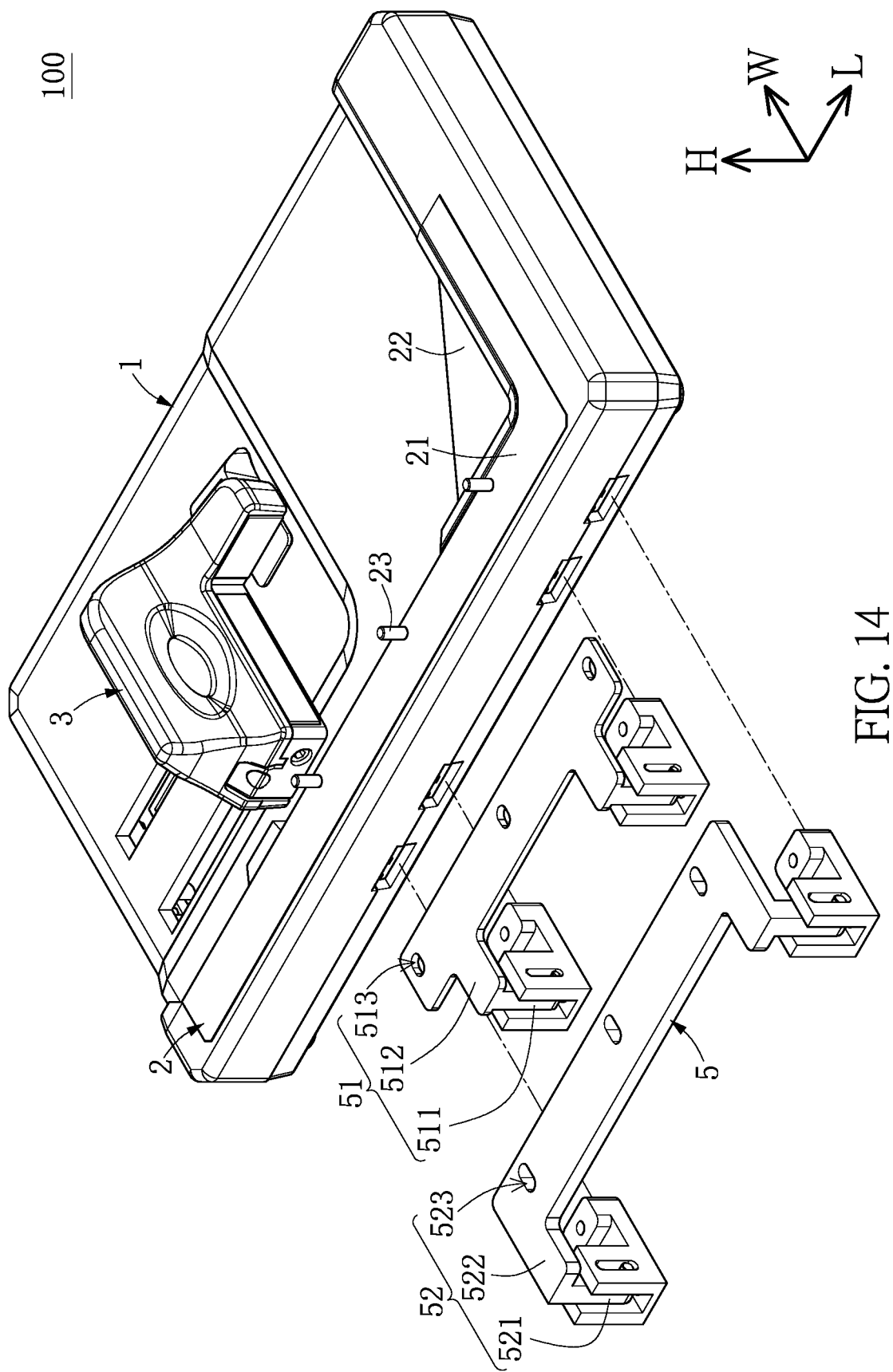
FIG. 14 is an exploded view of FIG. 12.

As shown in FIGS. 6, 10, and 11, the clamping mechanism 3 includes a moving unit 31, a holder 32 connected to the moving unit 31, and a supporting member 33 detachably fastened to the holder 32. A part of the moving unit 31 is arranged in the carrier 1, and another part of the moving unit 31 passes through the rail holes 141 and is connected to the holder 32. Accordingly, the moving unit 31 is configured to move the holder 32 for adjusting a relative position between the holder 32 and the positioning corner 211. When the mobile device 200 is disposed on the carrying surface 11 of the carrier 1, the holder 32 and the positioning corner 211 are configured to respectively clamp two diagonal corners of the mobile device 200, so that the glass screen film structure 300 sleeving around the positioning pillars 23 can be disposed on and aligned with the mobile device 200.

As shown in FIGS. 8 and 9, the moving unit 31 in the present embodiment includes a rail member 311, a sliding member 312, and an elastic member (not shown). The rail member 311 is disposed in the carrier 1. The sliding member 312 is slidably disposed on the rail member 311 and partially protrudes from the carrier 1 via the rail holes 141. The elastic member is connected to the sliding member 312 so as to allow that the sliding member 312 moves toward the positioning corner 211.

As shown in FIGS. 6, 10, and 11, the holder 32 includes a longitudinal holding member 321 fixed on the moving unit 31 (e.g., the sliding member 312) and a transverse holding member 322 movably connected to the longitudinal holding member 321. The longitudinal holding member 321 and the transverse holding member 322 are movable along the longitudinal direction L via the moving unit 31 (e.g., the longitudinal holding member 321 and the transverse holding member 322 are moved by moving the sliding member 312 along the rail member 311), and the transverse holding member 322 is movable along the width direction W relative to the longitudinal holding member 321. Moreover, the longitudinal holding member 321 is preferably provided with an elastic member (not labeled) for allowing that the transverse holding member 322 moves toward the receiving groove 212 relative to the longitudinal holding member 321.

Specifically, the longitudinal holding member 321 includes a seat 3211 fastened to the moving unit 31 (e.g., the sliding member 312) and a longitudinal holding portion 3212 fixed to the seat 3211. The longitudinal holding portion 3212 is preferably parallel to the width direction W. In other words, the longitudinal holding portion 3212 faces the lateral wall 2112 of the positioning corner 211.

The transverse holding member 322 includes a slider 3221 slidably disposed on the seat 3211 and a transverse holding portion 3222 fixed on the slider 3221. The transverse holding portion 3222 is preferably parallel to the longitudinal direction L. In other words, the transverse holding portion 3222 faces the receiving groove 212. The longitudinal holding portion 3212 and the transverse holding portion 3222 jointly define a corner obliquely facing the positioning corner 212.

Moreover, the transverse holding member 322 is spaced apart from the carrier 1, and the transverse holding portion 3222 is hung over the carrier 1. In other words, the transverse holding portion 3222 is spaced apart from the bottom of the accommodating trough 14 by a distance.

The supporting member 33 is detachably fastened to the slider 3221 of the transverse holding member 322, and a part of the supporting member 33 is arranged between the transverse holding portion 3222 and the bottom of the accommodating trough 14, thereby preventing the transverse holding member 322 from offsetting relative to the carrier 1.

Accordingly, when the glass screen film applicator 100 of the present embodiment is used to position the mobile device 200, the positioning corner 211, the abutting block 4, and the holder 3 of the glass screen film applicator 100 respectively abut against three corners of the mobile device 200, thereby firmly positioning the mobile device 200 on the carrier 1 through the three-points positioning manner.

Second Embodiment

Reference is made to FIGS. 12 to 15, which illustrate a second embodiment of the present disclosure. The second embodiment is similar to the first embodiment, and the difference between the second embodiment and the first embodiment resides in that the glass screen film applicator 100 of the present embodiment further includes a height adjustment assembly 5.

Specifically, the height adjustment assembly 5 is fastened to the carrier 1 and is arranged adjacent to the L-shaped structure 21 (or the positioning pillars 23). The height adjustment assembly 5 in the present embodiment includes a first pivotal structure 51 and a second pivotal structure 52 cooperating with the first pivotal structure 51. A height position of the glass screen film structure 300 held on the glass screen film applicator 100 can be adjusted by the first pivotal structure 51 and/or the second pivotal structure 52, so that the glass screen film applicator 100 can be applied to mobile devices 200 having a different thickness.

The first pivotal structure 51 is fastened to the carrier 1 and is arranged adjacent to the positioning pillars 23. The first pivotal structure 51 includes a first fastening portion 511 and a first sheet 512 connected to the first fastening portion 511. The first fastening portion 511 is fastened to and rotatable relative to the carrier 1. The first fastening portion 511 in the present embodiment is a pivotally rotatable structure, but the structure of the first fastening portion 511 in the present disclosure can be changed according to design requirements.

Moreover, the first sheet 512 in the present embodiment is in an elongated shape parallel to the longitudinal direction L. The first sheet 512 has a plurality of first thru-holes 513 arranged along the longitudinal direction L. The first thru-holes 513 respectively correspond in position to the positioning pillars 23. Each of the first thru-holes 513 in the present embodiment is larger than a cross section of each of the positioning pillars 23.

Figure 15:
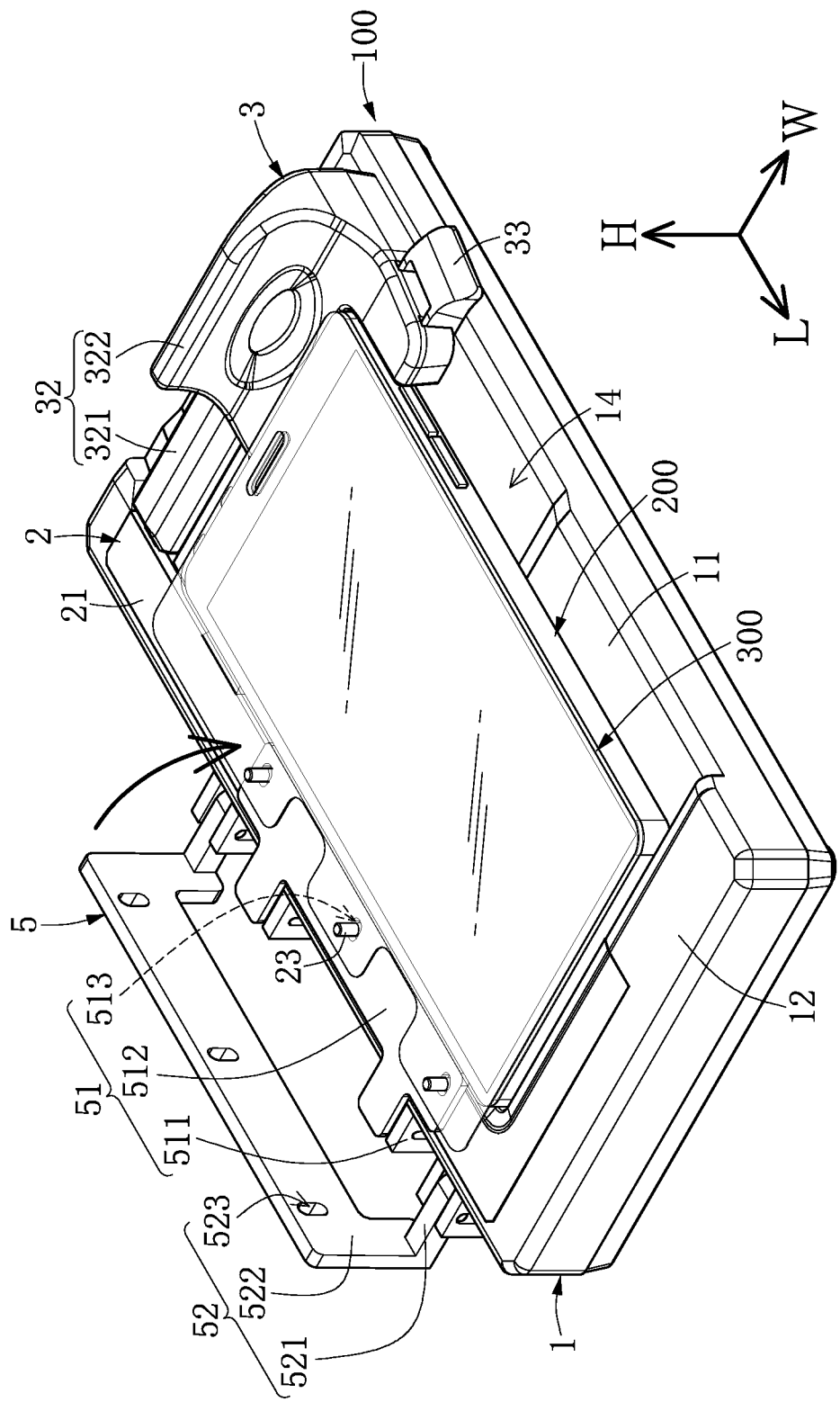
FIG. 15 is a perspective view showing the glass screen film applicator applied to a film attaching process according to the second embodiment of the present disclosure.

In addition, when the first fastening portion 511 is rotated to place the first sheet 512 on the L-shaped structure 21, the positioning pillars 23 formed on the L-shaped structure 21 respectively pass through the first thru-holes 513 for positioning the glass screen film structure 300 (as show in FIG. 15).

The second pivotal structure 52 is fastened to the carrier 1 and is arranged adjacent to the first pivotal structure 51. The second pivotal structure 52 includes a second fastening portion 521 and a second sheet 522 connected to the second fastening portion 521. The second fastening portion 521 is fastened to and rotatable relative to the carrier 1. The second fastening portion 521 in the present embodiment is a pivotally rotatable structure, but the structure of the second fastening portion 521 in the present disclosure can be changed according to design requirements.

Moreover, the second sheet 522 in the present embodiment is in an elongated shape parallel to the longitudinal direction L. The second sheet 522 has a plurality of second thru-holes 523 arranged along the longitudinal direction L. The second thru-holes 523 respectively correspond in position to the positioning pillars 23. Each of the second thru-holes 523 in the present embodiment is larger than a cross section of each of the positioning pillars 23.

In addition, when the first sheet 512 is placed on the L-shaped structure 21 and the second fastening portion 521 is rotated to place the second sheet 522 on the first sheet 512, the positioning pillars 23 formed on the L-shaped structure 21 respectively pass through the second thru-holes 523. In other words, each of the positioning pillars 23 sequentially passes through the corresponding first thru-hole 513 and the corresponding second thru-hole 523.

Specifically, as shown in FIG. 15, the second sheet 522 and the first sheet 512 can clamp a portion of the glass screen film structure 300 sleeving around the positioning pillars 23, thereby effectively maintaining the relative position of the glass screen film structure 300 and the mobile device 200. Moreover, the glass screen film structure 300 can be disposed on the second sheet 522 stacked on the first sheet 512, and sleeving around the top portion of each of the positioning pillars 23 passing through the second sheet 522, so that the glass screen film applicator 100 can be applied to the mobile devices 200 having a larger thickness. Accordingly, the glass screen film applicator 100 of the present embodiment can be applied to the mobile device 200 of at least three different thicknesses.

In the present embodiment, the glass screen film applicator 100 is provided with the first pivotal structure 51 and the second pivotal structure 52, but the present disclosure is not limited thereto. For example, in other embodiments of the present disclosure, the height adjustment assembly 5 can further includes a third pivotal structure, or the height adjustment assembly 5 can only include the first pivotal structure 51.

Third Embodiment

Figure 16:
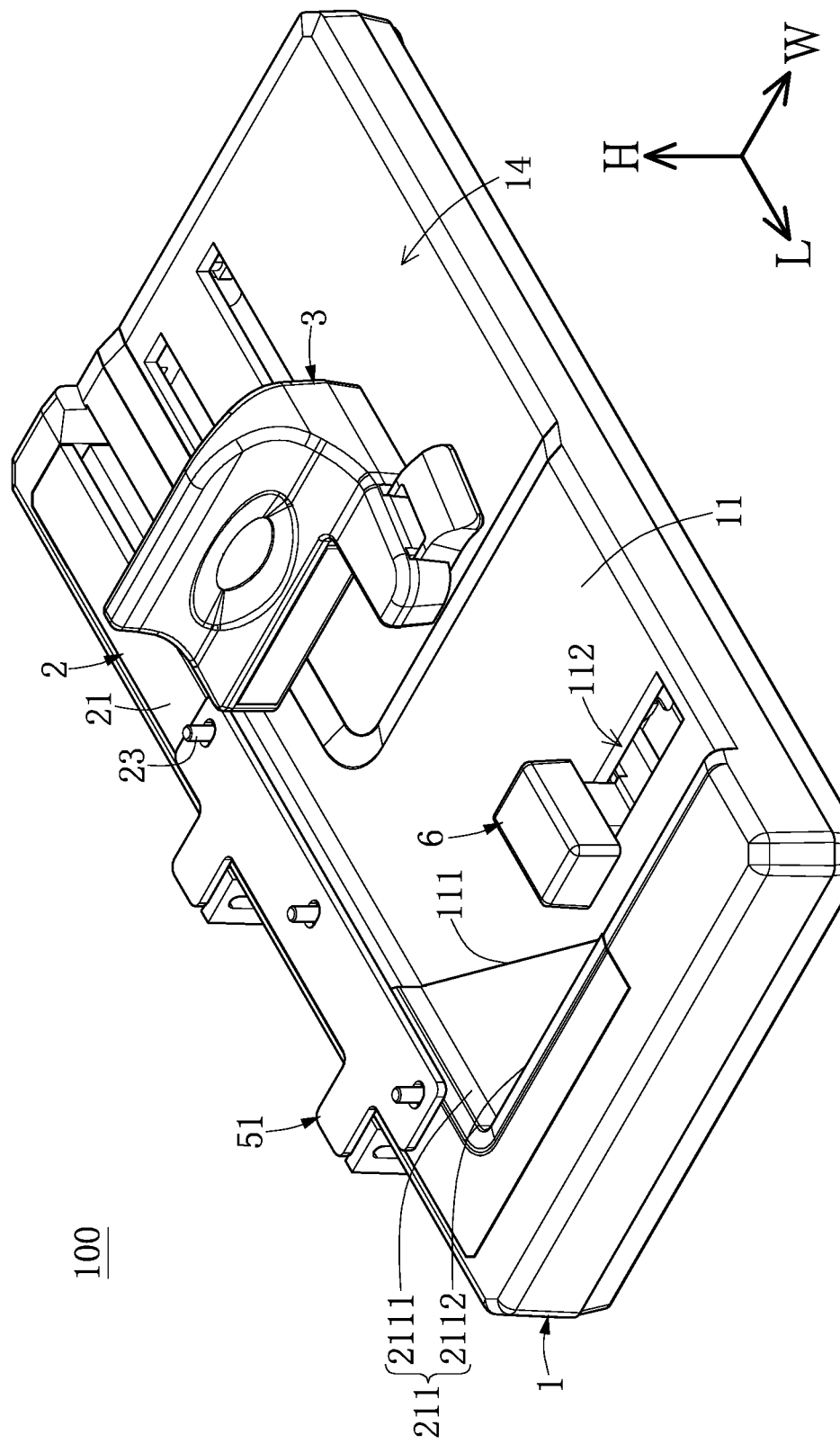
FIG. 16 is a perspective view showing a glass screen film applicator according to a third embodiment of the present disclosure.
Figure 17:
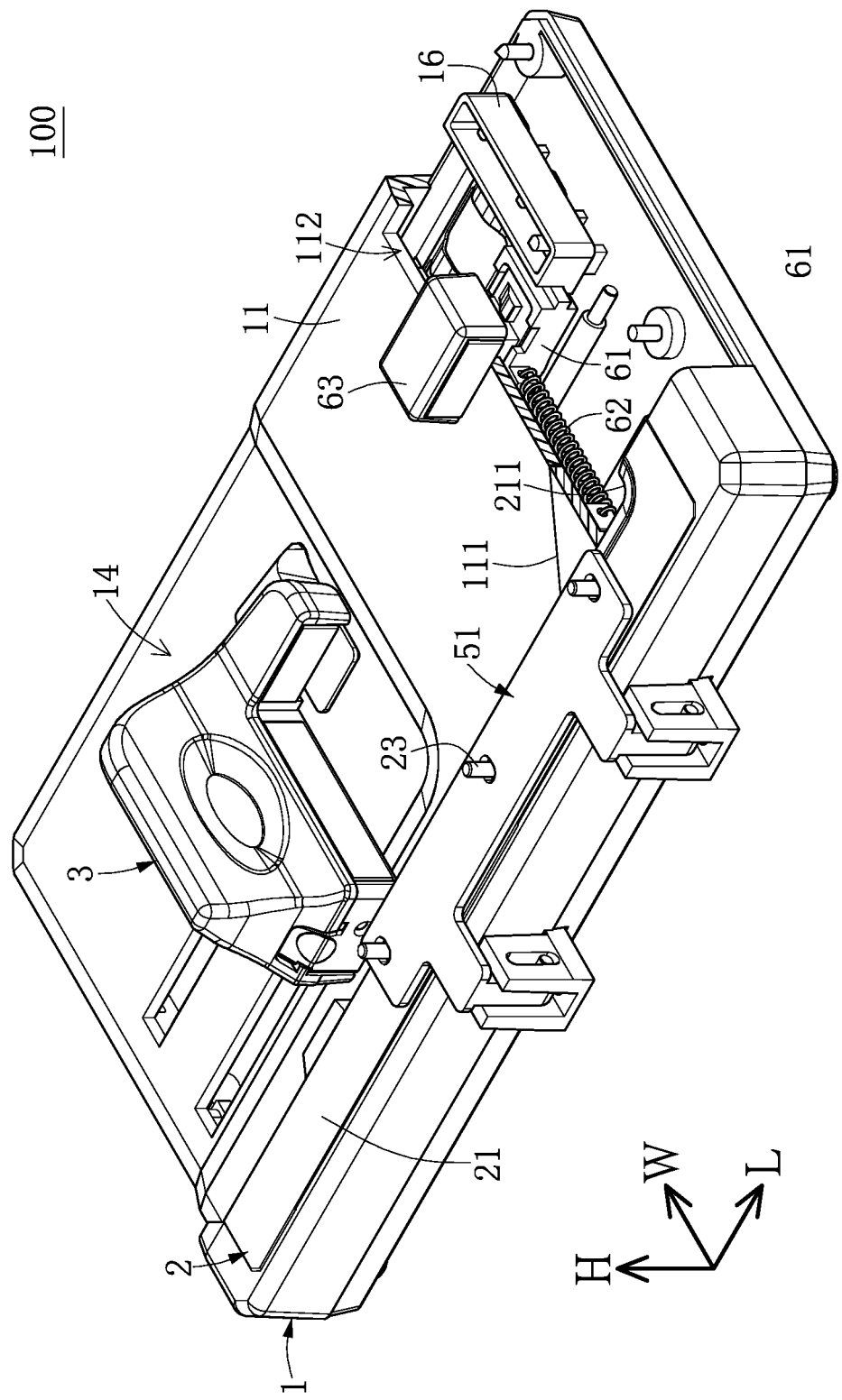
FIG. 17 is a perspective cross-sectional view showing the glass screen film applicator.
Figure 18:
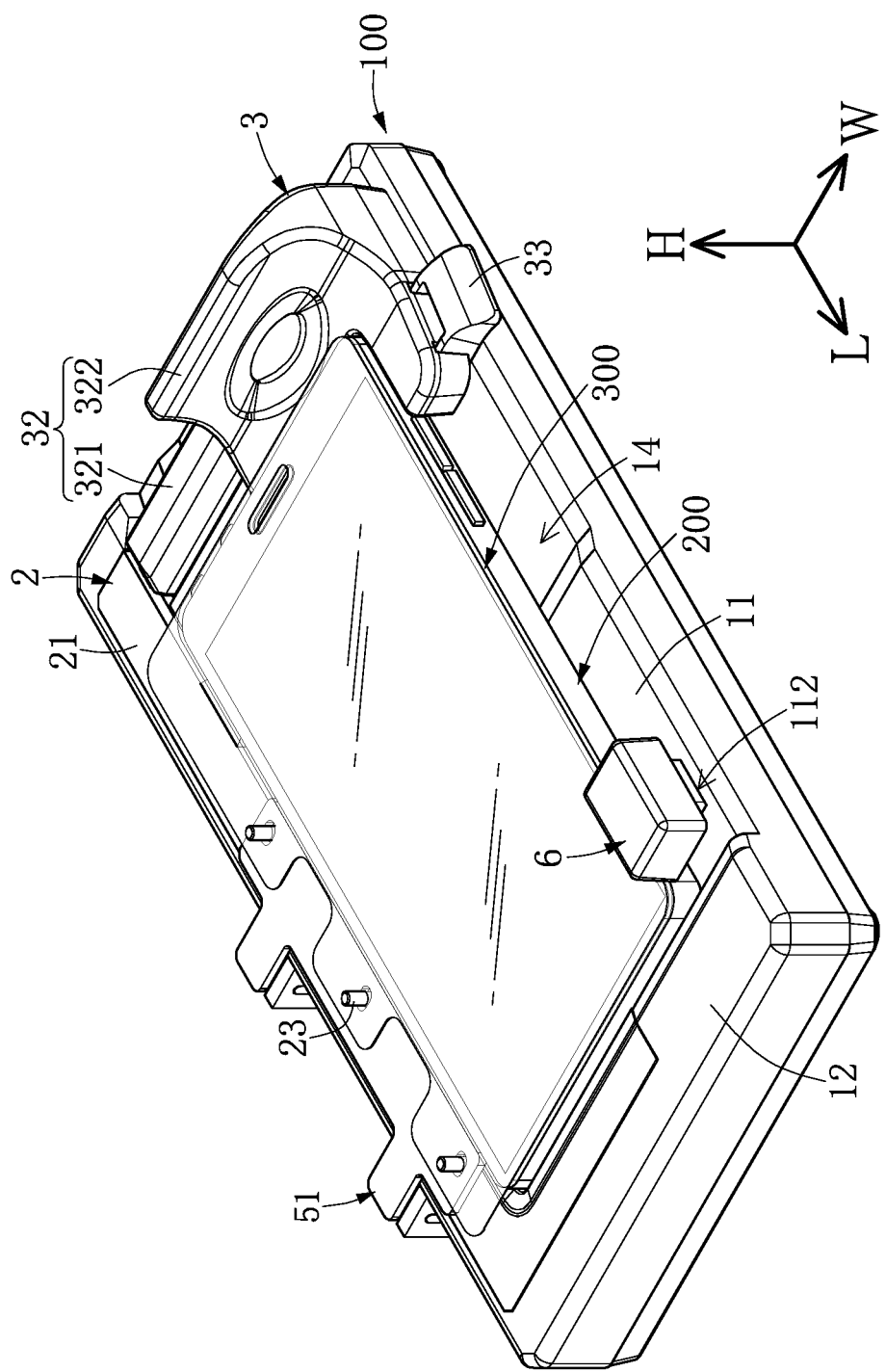
FIG. 18 is a perspective view showing the glass screen film applicator applied to a film attaching process according to the third embodiment of the present disclosure.

Reference is made to FIGS. 16 to 18, which illustrate a third embodiment of the present disclosure. The third embodiment is similar to the second embodiment, and the difference between the third embodiment and the second embodiment resides in that the glass screen film applicator 100 of the present embodiment further includes a retainer 6 and corresponding structure of the carrier 1.

Specifically, the carrier 1 has an elongated hole 112 recessing in the carrying surface 11 and parallel to the width direction W. The elongated hole 112 faces a substantial middle portion of the chamfer 111 in the width direction W. In other words, the elongated hole 112 is arranged apart from the accommodating trough 14. Moreover, the carrier 1 includes an inner rail portion 16 arranged therein and corresponding in positioning to the elongated hole 112.

The retainer 6 is movably connected to the carrier 1 by passing through the elongated hole 112 and is arranged apart from the accommodating trough 14. In the present embodiment, the retainer 6 includes a moving portion 61, an elastic member 62, and a retaining portion 63. The moving portion 61 is movably arranged in the carrier 1 and is slidable along the inner rail portion 16. The elastic member 62 is arranged in the carrier 1, and the elastic member 62 connects the moving portion 61 and an inner portion of the carrier 1 that is under the reinforcing sheet 22. The retaining portion 63 is fastened to the moving portion 61 by passing through the elongated hole 112 and not in contact with the carrying surface 11. In other words, the retaining portion 63 is substantially arranged out of the carrier 1.

Moreover, the elastic member 62 is configured to pull the moving portion 61 and the retaining portion 63 toward the lateral wall 2111 of the positioning corner 211 parallel to the longitudinal direction L. Accordingly, when the glass screen film applicator 100 of the present embodiment is used to position the mobile device 200, the positioning corner 211, the abutting block 4, the holder 3, and the retainer 6 of the glass screen film applicator 100 respectively abut against four corners of the mobile device 200, thereby firmly positioning the mobile device 200 on the carrier 1 through the four-points positioning manner.

Technical Effects of the Present Embodiments

In summary, the present disclosure provides a glass screen film applicator and a carrier module having technical features including that, since the L-shaped structure, the reinforcing sheet, and the positioning pillars are integrally formed as a one-piece structure, the positioning corner of the L-shaped structure and the reinforcing sheet can provide movement restrictions in longitudinal direction, the width direction, and the height direction to the mobile device, and the relative position of the positioning pillars, the positioning corner of the L-shaped structure, and the reinforcing sheet can be effectively maintained. Therefore, the glass screen film structure sleeving around the positioning pillars and the mobile device abutted against the positioning corner (and the reinforcing sheet) can have a more accurate relative position therebetween.

The descriptions illustrated supra set forth simply the exemplary embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A carrier module of a glass screen film applicator, comprising:
 a carrier including a mounting slot and an accommodating trough, wherein the carrier defines a longitudinal direction and a width direction perpendicular to the longitudinal direction, and the accommodating trough includes a rail hole recessed in a bottom thereof and parallel to the longitudinal direction; and
 a positioning member integrally formed as a one-piece structure and mounted in the mounting slot, wherein the positioning member includes an L-shaped structure and a plurality of positioning pillars extending from the L-shaped structure and arranged in a row parallel to the longitudinal direction, the L-shaped structure has a positioning corner arranged on an inner side of the L-shaped structure, each of the positioning pillars is perpendicular to the longitudinal direction and the width direction, and the positioning corner has two lateral walls parallel to the longitudinal direction and the width direction, respectively,
 wherein the positioning corner is configured to abut against a corner of a mobile device, and the positioning pillars are configured to position a glass screen film structure.

2. A glass screen film applicator, comprising:
 a carrier including a mounting slot and an accommodating trough, wherein the carrier defines a longitudinal direction and a width direction perpendicular to the longitudinal direction, and the accommodating trough includes a rail hole recessed in a bottom thereof and parallel to the longitudinal direction;
 a positioning member integrally formed as a one-piece structure and mounted in the mounting slot, wherein the positioning member includes an L-shaped structure and a plurality of positioning pillars extending from the L-shaped structure and arranged in a row parallel to the longitudinal direction, the L-shaped structure has a positioning corner arranged on an inner side of the L-shaped structure, each of the positioning pillars is perpendicular to the longitudinal direction and the width direction, and the positioning corner has two lateral walls parallel to the longitudinal direction and the width direction, respectively; and
 a clamping mechanism including a holder and a moving unit, wherein a part of the moving unit is arranged in the carrier, and another part of the moving unit passes through the rail hole and is connected to the holder, wherein the moving unit is configured to move the holder for adjusting a relative position between the holder and the positioning corner, and the positioning pillars are configured for positioning a glass screen film structure; and
 wherein when a mobile device is disposed on the carrier, the holder and the positioning corner are configured to respectively clamp two diagonal corners of the mobile device, and the positioning pillars are configured to allow the glass screen film structure to be disposed on and aligned with the mobile device.

3. The glass screen film applicator as claimed in claim 2, wherein the holder includes:
   a longitudinal holding member fixed on the moving unit; and
   a transverse holding member movably connected to the longitudinal holding member, wherein the longitudinal holding member and the transverse holding member are movable along the longitudinal direction via the moving unit, and the transverse holding member is movable along the width direction relative to the longitudinal holding member.

4. The glass screen film applicator as claimed in claim 3, wherein the longitudinal holding member includes a longitudinal holding portion parallel to the width direction, the transverse holding member includes a transverse holding portion parallel to the longitudinal direction, and the longitudinal holding portion and the transverse holding portion jointly define a corner obliquely facing the positioning corner.

5. The glass screen film applicator as claimed in claim 4, wherein the transverse holding member is spaced apart from the carrier, the transverse holding portion is spaced apart from the carrier by a distance, the clamping mechanism further includes a supporting member detachably fastened to the transverse holding member, and a part of the supporting member is arranged between the transverse holding portion and the bottom of the accommodating trough.

6. The glass screen film applicator as claimed in claim 2, wherein the carrier has a carrying surface, the carrying surface has a chamfer arranged adjacent to the positioning corner, the accommodating trough is recessed in the carrying surface, the positioning member includes a reinforcing sheet integrally connected to the two lateral walls of the positioning corner, the reinforcing sheet is in complementation with the chamfer, and an outer surface of the reinforcing sheet is coplanar with the carrying surface of the carrier.

7. The glass screen film applicator as claimed in claim 6, wherein the carrier has an elongated hole recessing in the carrying surface and parallel to the width direction, the elongated hole faces a substantial middle portion of the chamfer in the width direction, the glass screen film applicator further comprises a retainer movably connected to the carrier and arranged apart from the accommodating trough, and the retainer includes:
   a moving portion movably arranged in the carrier;
   an elastic member arranged in the carrier, wherein the elastic member connects the moving portion and an inner portion of the carrier; and
   a retaining portion fastened to the moving portion by passing through the elongated hole and not in contact with the carrying surface, wherein the elastic member is configured to pull the moving portion and the retaining portion toward the lateral wall of the positioning corner parallel to the longitudinal direction.

8. The glass screen film applicator as claimed in claim 2, wherein the L-shaped structure includes a receiving groove parallel to the longitudinal direction, the receiving groove is recessed in a lateral surface of the L-shaped structure facing the clamping mechanism, and when the mobile device is disposed on the carrier, the receiving groove is configured to accommodate at least one button arranged on a lateral side of the mobile device.

9. The glass screen film applicator as claimed in claim 8, wherein the carrier includes a stepped portion parallel to the longitudinal direction and arranged in the mounting slot, the stepped portion is arranged adjacent to the receiving groove, the glass screen film applicator further comprises an abutting block movably disposed on the receiving groove and the stepped portion, the abutting block is movable along the receiving groove and the stepped portion, and when the mobile device is disposed on the carrier, the abutting block is configured to abut against the lateral side of the mobile device.

10. The glass screen film applicator as claimed in claim 2, further comprising a first pivotal structure fastened to the carrier and arranged adjacent to the positioning pillars, wherein the first pivotal structure includes:
   a first fastening portion fastened to and rotatable relative to the carrier; and
   a first sheet connected to the first fastening portion and having a plurality of first thru-holes, wherein when the first fastening portion is rotated to place the first sheet on the L-shaped structure, the positioning pillars formed on the L-shaped structure respectively pass through the first thru-holes for positioning the glass screen film structure.

11. The glass screen film applicator as claimed in claim 10, further comprising a second pivotal structure fastened to the carrier and arranged adjacent to the first pivotal structure, wherein the second pivotal structure includes:
   a second fastening portion fastened to and rotatable relative to the carrier; and
   a second sheet connected to the second fastening portion and having a plurality of second thru-holes, wherein when the first sheet is placed on the L-shaped structure and the second fastening portion is rotated to place the second sheet on the first sheet, the positioning pillars formed on the L-shaped structure respectively pass through the second thru-holes.

12. The glass screen film applicator as claimed in claim 2, further comprising a retainer movably connected to the carrier and arranged apart from the accommodating trough, wherein the retainer includes:
   a moving portion movably arranged in the carrier;
   an elastic member arranged in the carrier, wherein the elastic member connects the moving portion and an inner portion of the carrier; and
   a retaining portion fastened to the moving portion and arranged out of the carrier,
   wherein the elastic member is configured to pull the moving portion and the retaining portion toward the lateral wall of the positioning corner parallel to the longitudinal direction.

* * * * *